United States Patent [19]

Gleason

[11] 4,021,957

[45] May 10, 1977

[54] FISHLINE JERKING DEVICE, BITE SIGNAL AND SCALE

[76] Inventor: Martin G. Gleason, 1618 N. Gardiner Drive, N. Bayshore, N.Y. 11706

[22] Filed: Apr. 26, 1976

[21] Appl. No.: 680,500

[52] U.S. Cl. .............................................. 43/16
[51] Int. Cl.² ...................................... A01K 97/12
[58] Field of Search ....................... 43/16, 15, 17

[56] References Cited

UNITED STATES PATENTS

| 711,318 | 10/1902 | Hymers | 43/15 |
| 2,784,515 | 3/1957 | McBride et al. | 43/15 |
| 3,006,102 | 10/1961 | Chapman | 43/15 |
| 3,608,227 | 9/1971 | Adams | 43/17 |

FOREIGN PATENTS OR APPLICATIONS

| 633,322 | 10/1927 | France | 43/15 |

*Primary Examiner*—Warner H. Camp
*Attorney, Agent, or Firm*—Jack D. Slobod

[57] ABSTRACT

A fishline jerking device includes an elongated casing having a first loop at one end and a longitudinally movable rod projecting from the other end of the casing. The rod is terminated with a second loop enabling a fishline to be serially double wrapped about the two loops. A spring about the rod urges the rod to move rearward to a position where a contact carried by the rod engages a contact carried by the casing to complete a circuit with a battery and lamp as a fish bite signal. The rod is normally retained in a forward position by a releasable spring loaded catch. In response to a side thrust exerted on the second loop by the line, the rod passes the catch and snaps rearward to jerk the line. A pointer carried by the rod cooperates with a slot in the casing and graduations along the slot to form a scale.

1 Claim, 2 Drawing Figures

FISHLINE JERKING DEVICE, BITE SIGNAL AND SCALE

FIELD OF THE INVENTION

The present invention relates generally to devices for jerking a fishline for seating a hook into a fish. In its particular aspects the present invention relates to a device having a pair of relatively movable spaced apart loops through which a fishline is serially wrapped.

BACKGROUND OF THE INVENTION

In the prior art, spring loaded fishline jerking devices have been provided mounted on a fishing rod. Such devices have been complicated of construction and have not been suitable for applications where a plurality of independent hook terminated lines are provided branching from or otherwise coupled to a main fishing line. Further, such devices have not provided any suitable signal indication when a fishbite triggers the jerking device. Additionally, the potential of using the spring of the jerking device as the weight-responsive element of a scale has not been recognized in the prior art.

OBJECTS OF THE INVENTION

It is an object of the present invention to provide a fishline jerking device having a pair of relatively movable loops at opposite ends of the device for serial engagement with a fishline.

It is another object of the present invention to provide a triggerable fishline jerking device which includes means for illuminating an indicator lamp in response to triggering of the device.

It is yet another object of the present invention to provide a spring loaded fishline jerking device which utilizes the springs as the weight responsive element of a scale.

SUMMARY OF THE INVENTION

Briefly, the aforementioned and other objects of the present invention are satisfied by providing a fishline jerking device including an elongated casing having front and rear ends. A first loop is provided fixedly upstanding from the rear end of the casing while an elongated member is mounted longitudinally in the casing and projects therefrom. This member carries a second loop at its forward end and is movable longitudinally between first and second positions relative to the casing. The fishline is wrapped serially about the first and second loops at spaced apart locations along the line.

In the first position, the elongated member projects further from the casing than in the second position. The elongated member carries a spring urging the member to the second position. The device is cocked or armed by pulling the member to the first position where it is retained by a spring loaded releasable catch. In response to a force component applied to the second loop via the line by a fish, the member snaps past the catch and into the second position carrying the line and applying a jerk thereto to set a hook carried at the end of the line into the fish.

For signalling the fish bite and the resultant setting of the hook, a lamp holding means and battery holding means are carried by the casing in a series circuit completed by a first contact carried by the elongated member engaging a second contact carried by the casing. It will be appreciated that the second contact is located to be engaged when the member is in the second position. To enable this signalling when desired, a manully actuatable switch is also provided in series with the aforementioned circuit.

In order to enable the device of the present invention to act as a scale, an elongated longitudinally directed slot is provided in the wall of the casing and a pointer is carried by the elongated member for movement therealong in response to the compression of the spring which urges the member to the second position. Graduations are also provided along the slot for cooperation with the pointer to enable the weight of the fish suspended from the line to be measured.

Other objects, features and advantages of the present invention will become apparent upon perusal of the following detailed description of the preferred embodiment thereof when taken in conjunction with the appended drawing wherein:

DETAILED DESCRIPTION

Figure 1:
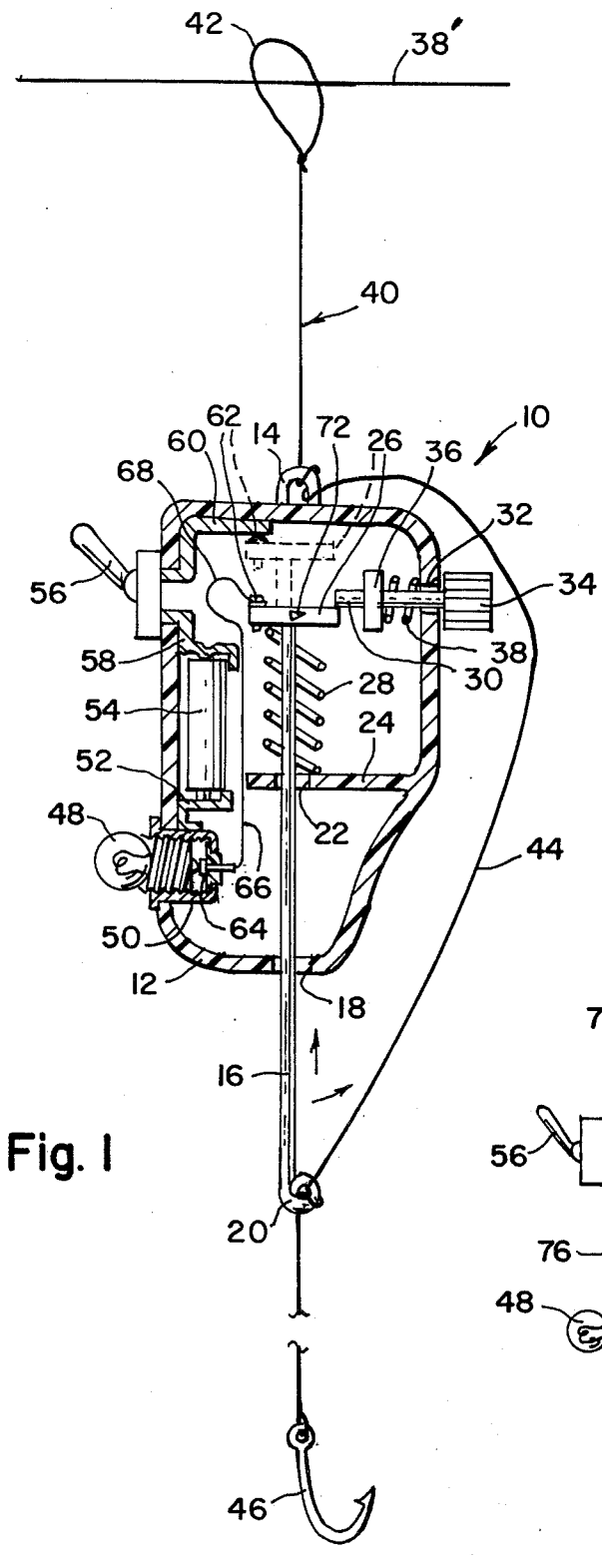
FIG. 1 is a cross-sectional side elevational view of the fishline jerking device of the present invention with its parts positioned as cocked.
Figure 2:
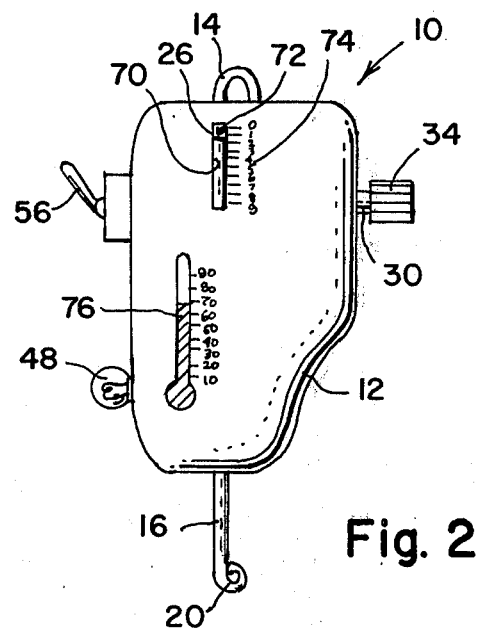
FIG. 2 is a side-elevational view of the exterior of the device of the present invention with its parts positioned as after the device is triggered.

Referring to FIGS. 1 and 2 of the drawing, the fishline jerking device of the present invention is generally indicated by the reference numeral 10. The device 10 comprises an elongated casing 12 fixedly carrying an upstanding rigid loop 14 at its rear or upper end and an elongated rod 16 slideably mounted longitudinally within casing 12 and projecting outward from a front or bottom end of the casing via an aperture 18 in the casing wall. The rod 16 is bent at its front or lower end into a rigid loop 20. Rod 16 is mounted slideably through an aperture 22 in a transversely directed web 24 within casing 12. The apertures 18, 22 are longitudinally aligned and serve as guides for rod 16. The diameters of apertures 18, 20 are however somewhat larger than the cross-sectional diameter of rod 16 to enable the rod to cant at a slight angle to the longitudinal axis defined by the centers of the apertures.

Rod 16 terminates at its rear or upper end in a head 26 of enlarged diameter and a helical spring 28 positioned coaxially about rod 16 acts between head 26 and web 24 to urge the rod to move longitudinally rearward or upward. The device 10 is cocked or armed by pulling rod 16 forward or downward to position the rod as shown in FIG. 1. A shaft 30, directed perpendicular to rod 16, passes slideably through an aperture 32 in casing 12 and has a cylindrical knob 34 at its outer end and a radial flange 36 at a point intermediate its length within casing 12. A spring 38 is coaxially positioned about shaft 30 and acts between flange 36 and the side of casing 12 to urge the shaft inward. The innermost tip of shaft 30 engages head 26 to retain the rod 16 in the cocked position as a releasable catch. The knob 34 is pulled back momentarily to seat the rod 16 in its cocked position.

In the type of fishing in which plural independent hooked lines are provided joined to a common main line 38', each independent line is formed by a fishline 40 having a loop 42 at its upper end through which main line 38' is passed. Fishline 40 is then directed from loop 42 to the upstanding rigid loop 14 carried by the casing 12. Fishline 40 is double wrapped about loop 14 and directed via a slack portion 44 to loop 20 where it is again double wrapped and then terminated with a fish hook 46. It will be appreciated that this double-wrapping anchors line 40 to loops 14 and 20.

If a fish bites on hook 46, a slight component of force will be applied to loop 20 perpendicular to the axis of rod 16 which will cause rod 16 to cant with respect to the axis defined by apertures 18, 20. The tip of shaft 30 is in relatively slight engagement with head 26 and in response to this canting action the head 26 will move to the left in FIG. 1 and slip by shaft 30. Then the spring 28 will propel rod 16 rearward in casing 12 to the position shown in phantom in FIG. 1. This sudden rearward movement of rod 16 will jerk hook 46 for seating the hook in the fish.

For signalling that a fish has been hooked, a lamp 48 is provided in a socket 50 carried by casing 12. The threaded side of socket 50, forming one terminal thereof is engaged by one end of a metal strip 52 carried by casing 12. The other end of strip 52 engages one terminal of a battery 54. A toggle switch 56 is carried on the side of casing 12 and a metal strip 58, forming one terminal of switch 56 engages the other terminal of battery 54. The strips 52, 56 are configured to hold battery 54 therebetween. A metal strip 60, forming the other terminal of switch 56, is adhered along the rear or upper part of the interior of the wall of casing 12. A screw 62, carried by head 26, is adapted to contact strip 60 when rod 16 is in its rearward or upward position after device 10 has been triggered. Screw 62 is connected to the center terminal 64 of socket 50 via a flexible lead 66 having an adequate service loop 68 to enable rod 16 to move freely. It will be appreciated that lamp 48, switch 56 and battery 54 lie in a series circuit which is completed when screw 62 contacts strip 60. If switch 56 is in its "on" position the lamp 48 will light to signal that a fish has been hooked.

In order to weigh a fish suspended from line 40 on hook 46, an elongated longitudinally directed slot 70 is provided in the upper part of casing 12 spanning the distance between the extreme longitudinal positions of head 26. A pointer 72 is carried on head 26 in a position to move along slot 70 when spring 28 is compressed in proportion to the weight of the fish. The spring 28 is chosen to compress an amount equal to the length of slot 70 in response to a longitudinal force of several pounds and graduated numerical indicia 74 are provided along slot 70 for cooperation with pointer 72 to enable the weight in pounds of a fish on hook 46 to be read.

As a further feature for reading temperature, a capillary type thermometer 76 may be mounted on casing 12.

While the preferred embodiment of the present invention has been described and illustrated in specific detail, it should be understood that numerous modifications, additions and omissions in the details thereof are possible within the intended spirit and scope of the invention claimed herein.

What is claimed is:

1. A combined fishline jerking device, bite signal and scale comprising: an elongated casing having front and rear ends; a first loop carried fixedly at the rear end of said casing; an elongated member mounted longitudinally in said casing for longitudinal movement relative to said casing between first and second positions; said member having one end projecting from the front end of said casing carrying a second loop; said first and second loops being adapted to receive a line wrapped serially about said first and second loops at spaced apart positions along said line; said first position being characterized by said elongated member projecting further from said casing than in said second position; spring means for urging said elongated member to said second position for jerking said line; releasable catch means acting against said member for retaining said member in said first position; said catch means being releasable in response to the application of a force component on said second loop by said line generally perpendicular to the axis of said member; a lamp holding means and a battery holding means carried by said casing; a first electrical contact carried by said elongated member; a second electrical contact carried by said casing in a location to be engaged by said first contact when said elongated member is in said second position; said first and second contacts forming a first switch means; said lamp holding means, battery holding means and first switch means being in a series circuit; a manually actuable second switch means in said series circuit; a longitudinally elongated slot in said casing; a pointer carried by said member for movement along said slot; and a series of graduations along said slot for cooperation with said pointer as a scale.

* * * * *